UNITED STATES PATENT OFFICE.

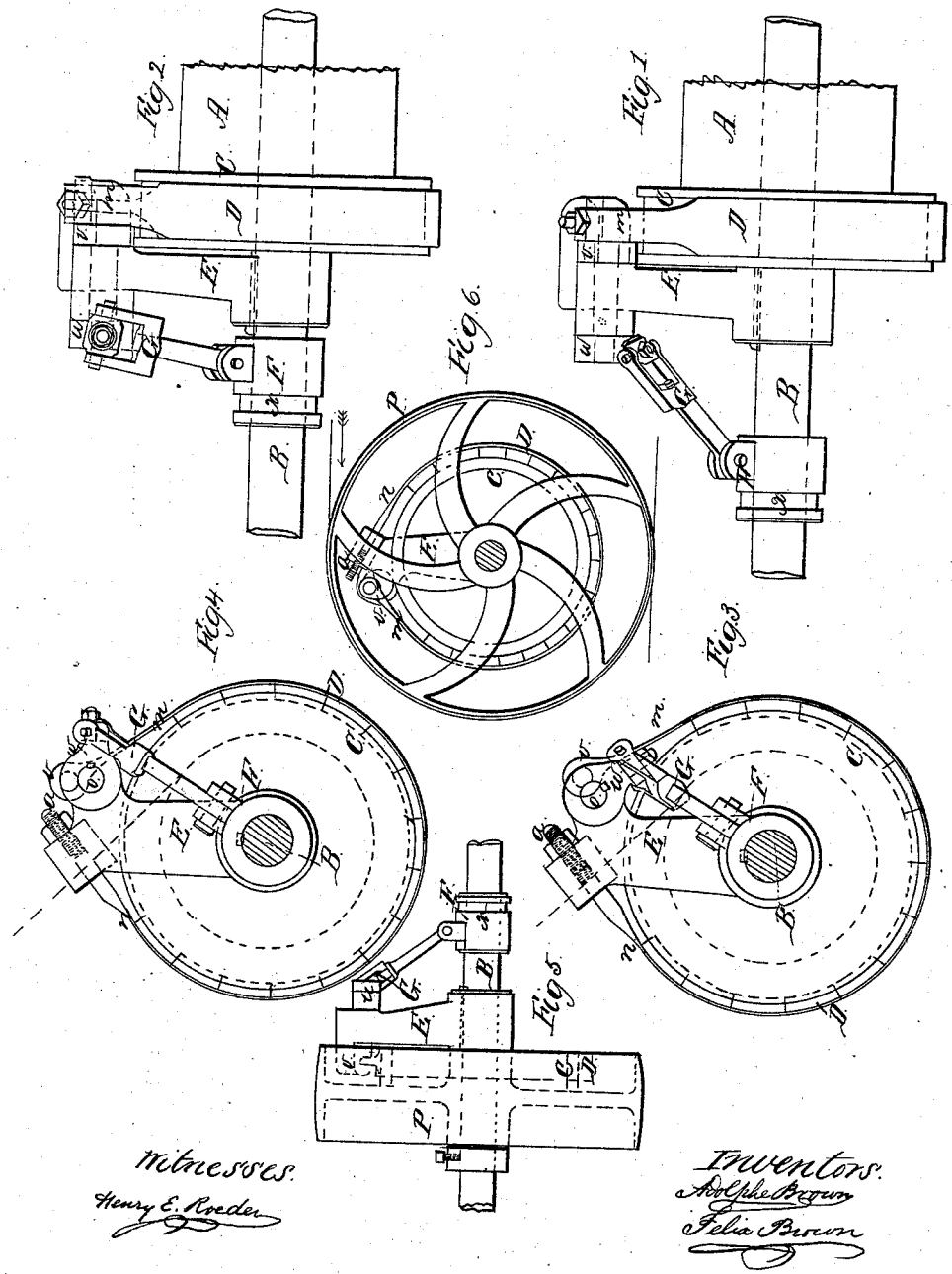

ADOLPH BROWN AND FELIX BROWN, OF NEW YORK, N. Y.

IMPROVEMENT IN FRICTION-COUPLINGS.

Specification forming part of Letters Patent No. 36,832, dated November 4, 1862.

*To all whom it may concern:*

Be it known that we, ADOLPH BROWN and FELIX BROWN, both of the city of New York, in the county and State of New York, have invented a new and Improved Friction-Coupling; and we do hereby declare that the following is a full and exact description thereof, reference being had to the accompanying drawings, and to the letters of reference marked thereon.

The nature of this invention consists in the arrangement, with a wheel, pulley, clutch, or their equivalents placed loosely upon a shaft, of a friction-band attached to an arm securely fastened on the shaft, one end of said friction-band being firmly attached to said arm, while the other end is attached to a lever or crank turning in a bearing at the end of the same said arm. This crank or lever is connected, through a universal joint or its equivalent, with an arm situated loosely on the shaft, capable of sliding upon the same. The action of this loose arm on the crank in the fast arm will operate the friction-band, so as to loosen or tighten the same around the wheel, pulley, or clutch, as may be desired, and consequently coupling or disengaging the same with the shaft while the latter is in motion.

Figure I represents a side view of the coupling arranged to a hoisting-wheel drum, and shown in the position when the latter is disengaged or loose on the shaft. Fig. II represents a side view of the same when the drum is coupled to the shaft. Fig. III is an end view of Fig. I. Fig. IV is an end view of Fig. III. Fig. V represents a front view of the coupling arranged for a pulley, and Fig. VI is an end view of the same.

Similar letters represent similar parts.

In the accompanying drawings, A represents part of a hoisting-wheel drum placed loosely on the shaft B, and provided with a pulley, C, to receive the friction-band D.

E is an arm firmly secured on the shaft B. To this arm E one end, $n$, of the friction-band D is fastened by means of a screw and nut, $a$, to regulate the same. A small shaft, $o$, is arranged in the end of this arm E, capable of turning, and provided with a small lever or cranks $v$ and $w$ on each end. To the crank $v$ the other end, $m$, of the friction-band D is securely fastened. The end of the crank $w$ is connected through a universal joint, G, or its equivalent, with an arm, F, placed loosely on the shaft B, and capable of sliding upon the same. The hub of this arm F is provided with a recess, $x$, into which a forked lever is made to work, for the purpose of moving the same backward or forward on the shaft, as may be required. When the arm F is moved up toward the fast arm E, as shown in Fig. II, the crank $w$ is moved outward, producing a corresponding motion of the crank $v$, whereby the friction-band D is tightened around the pulley C, so as to couple thereby the same, and consequently the hoisting-drum A, to which this said pulley C is attached, firmly with the arm E, and consequently to the shaft B. When the arm F is moved away from the fast arm E, as shown in Fig. I, the crank $w$ will be moved downward, and acts then, through the crank $v$, on the friction-band D, so as to loosen the same, and consequently the drum A.

In Figs. V and VI the coupling is arranged for a pulley, P, placed loosely upon the shaft B, and having the pulley C, upon which the friction-band D is placed, attached on the inside. By this arrangement any shifting of belting, and consequently the loose pulley on the intermediate shaft, is dispensed with.

By this improved coupling a drum or pulley may be easily coupled with a shaft in full motion without producing any shock or jarring to the machinery, and when applied to hoisting machinery the platform or weight may be hoisted or lowered, as may be desired, without stopping or reversing the shaft. When two shafts are required to be coupled together by this arrangement, the pulley around which the friction-band is placed is fastened to the end of one shaft, and the arm E is fastened to the end of the other shaft.

What we claim as our invention, and desire to secure by Letters Patent, is—

The herein-described friction-coupling, constructed and operating in the manner and for the purpose substantially as specified and set forth.

ADOLPH BROWN.
FELIX BROWN.

Witnesses:
HENRY E. ROEDER,
THOMAS DUGAN.